United States Patent Office 2,877,202
Patented Mar. 10, 1959

2,877,202
METHOD OF MODIFYING ALKYD RESINS WITH ALKOXYPOLYSILOXANES

Melvin M. Olson, Milwaukee, Wis., assignor to Pittsburgh Plate Glass Company, Allegheny County, Pa., a corporation of Pennsylvania No Drawing. Application October 7, 1953
Serial No. 384,763

2 Claims. (Cl. 260—45.4)

This invention relates to modified alkyd resins and it has particular relation to alkyd resins which have been modified by interchange esterification with an alkoxy substituted polysiloxane.

It has heretofore been recognized to prepare coatings from resins termed "silicones" by use of products of hydrolysis and condensation of phenyl or methyl silanes containing

groups and one or more hydrolizable groups such as halogen, alkoxy or acyloxy. Coatings of these materials have valuable properties such as hardness, impact resistance, chemical resistance, heat resistance, high gloss, and surface slip. These resins, which possess a carbon-silicon bonds, usually are prepared by reaction of an alkyl or aryl chloride with silicon in the presence of a catalyst such as metallic copper or aluminum chloride. In actual practice, they are quite expensive. Accordingly, they have enjoyed only relatively limited use. For most purposes, the use of more conventional materials such as the oil-modified alkyd resins has continued with but little competition from the more expensive silicon resins. This was true even though it was recognized that the alkyd resins left much to be desired from the standpoint of hardness, impact resistance, mar resistance, heat resistance, gloss, and various other valuable properties and in these respects were inferior to the silicones.

It has been suggested to modify alkyd resins by heat reacting a mixture of said resin and a silicone containing material comprising hydrocarbon groups directly attached to silicon through Si—C linkages to incorporate into the alkyd some of the superior properties of the silicon. Needless to say, such mode of incorporating silicon into alkyd resins was also highly objectionable because of the high cost of silicon compounds containing C—Si linkages.

It has further been suggested to incorporate silicon into alkyd resins by mixing an alkyl alkoxypolysiloxane and an alkyd resin and heating the resultant mixture under appropriate conditions to obtain reaction. This reaction reduces somewhat the amount of the expensive carbon-silicon linkage involved in the silica compound, but still the modified alkyds as thus obtained, are excessively expensive because substantial numbers of Si—C bonds are present in the silica compound.

It has further been suggested to incorporate silicon into an alkyd resin in the form of an alkyl orthosilicate. However, by such technique, less than 8 percent of silicate, calculated as glyceryl silicate, was incorporated into the resin. Such silicon as was so introduced was an orthosilicate in which there was no linkage between silicon atoms except through the alkyd resin chain.

It has now been discovered that alkoxy-substituted polysiloxanes which contain no carbon-silicon linkages whatever, but which are built of such linkages as those represented by the following formulae:

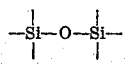

or

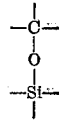

can successfully be reacted by a process of ester interchange with alkyd resins containing free hydroxyls to provide modified alkyd resins containing large amounts of silicon in the form of relatively large polysilicate molecules. Advantages of this process are, that relatively inexpensive alkoxypolysiloxanes such as can be obtained by reacting silicon tetrachloride with an appropriate alcohol and hydrolizing and condensing the resultant orthosilicate molecules in a single stage reaction, can be incorporated in large amounts, by ester interchange into the alkyd molecules to provide resins which are completely compatible and soluble in the usual solvents, such as xylene, toluene, and the like, and which when applied to and dried as films on various surfaces, possess great hardness, mar resistance, gloss and like properties.

Alkyd resins containing excess hydroxyls and being suitable for use with alkoxypolysiloxanes in accordance with the provisions of the present invention, may be of the conventional types. They comprise polyesters of polyhydric alcohols and polybasic acids which, in most instances, are further modified with a fatty acid such as an acid derived from a glyceride oil, e. g., a drying oil.

The techniques of preparing such polyesters is conventional and long established. Usually, the process involves cooking together the dicarboxylic acid and usually a fatty acid or a partial glyceride thereof and a polyhydric alcohol (the latter usually in slight stoichiometric excess) and ordinarily, in the presence of a catalyst such as litharge, sulfuric acid or a sulfonic acid and under inert gas such as nitrogen or carbon dioxide, in order to effect esterification reaction with evolution of water. The reaction is regarded as complete when water substantially ceases to evolve or when a low acid value or a high viscosity is reached. A number of such alkyd resins will subsequently be described in detail.

In the preparation of the alkyd resins, various polyhydric alcohols may be employed. These include dihydric alcohols, such as ethylene glycol, diethylene glycol, polyethylene glycol, propylene glycol, dipropylene glycol and the like. Likewise, dihydric phenols may be used. In most instances, however, it is preferable to employ alcohols containing a greater number of hydroxyls than occur in the foregoing. Of these, glycerol is probably the most common and the most economical. Other appropriate higher alcohols include pentaerythritol, sorbitol, mannitol, and others.

The polycarboxylic acids suitable for formation of the polyesters include both aromatic and aliphatic carboxylic acids and others. The most common and most economical of the polycarboxylic acids is phthalic acid (or its anhydride). It may, however, be replaced by isophthalic, terephthalic or other aromatic dicarboxylic acids.

Carboxylic acids of the aliphatic series which may be employed in part or in full as the polycarboxylic acid componet of the alkyd resins, include oxalic acid, succinic acid, sebacic acid, adipic acid, azelaic acid and the like.

In some instances it may be desirable to employ ethylenically unsaturated dicarboxylic acid such as carbic acid or alpha-beta, ethylenic acids such as maleic acid, fumaric acid, itaconic acid and others. It will be appreciated that these various polycarboxylic acids may be mixed in order to provide mixed polyesters of alkyds. For example, the ethylenically unsaturated type carboxylic acids containing alpha-beta ethylenic groups may be mixed with saturated acids in such proportions as may be desired, for example, in a molecular ratio of about .25 to 10 or 12 moles of the saturated acid per mole of the unsaturated acid. These ethylenically unsaturated acids are especially suitable for use in polyesters derived from dihydric alcohols such as ethylene glycol, diethylene glycol, or the like.

As previously indicated, the polyesters customarily are modified by the inclusion of a higher fatty acid such as may be derived from a glyceride oil. Suitable fatty acids include saturated and semi-saturated acids such as stearic acid, oleic acid, ricinoleic acid, palmitic acid, or drying oil acids such as linoleic acid, linolenic acid, licanic acid, elaeostearic acid, clupanodonic acid. These fattty acids may be in the form of the free acids, sufficient excess of the polyhydric alcohol being incorporated into the esterification mixture to compensate for their inclusion. However, in many instances, it is preferred to employ glyceride oils which have been partially alcoholized with a sufficient amount of a polyhydric alcohol such as glycerol to supply the requisite amount of available hydroxyls for the formation of the alkyd or polyester.

A fatty acid of a glyceride oil or its equivalent of the glyceride itself may be employed within a broad range of proportions with respect to the polycarboxylic acid. In many of the alkyds, the ratio of the fatty acid to polycarboxylic acid is approximately equimolecular. However, the proportion of fatty acid may be substantially lower, e. g., one-half mole, or less with respect to the polycarboxylic acid. On the other hand, the proportion of fatty acid may be substantially increased, for example, to 2 moles or more. It will be understood that the appearance of a fatty acid group on the extremity of a polyester molecule will normally terminate the extension of the molecule in that direction. A fatty acid radical or group, however, can be attached to an intermediate hydroxyl of a polyhydric alcohol such as glycerol without terminating the further linear extension of the molecule in the direction of the added monoglyceride.

The silicon compounds employed to modify the alkyd resins in accordance with this invention are alkoxypolysiloxanes which include a number of silicon atoms interlinked with each other by oxygen atoms. Most of the polysiloxane molecules should contain at least 4 silicon atoms in the chain and preferably the atoms should contain 6, or more silicon atoms with corresponding oxygen linkages. Usually, there will be some higher polysiloxanes but the molecules will seldom contain more than about 12 silicon atoms. In most instances, the polysiloxanes will contain a large amount of cyclic compounds represented by the formulae:

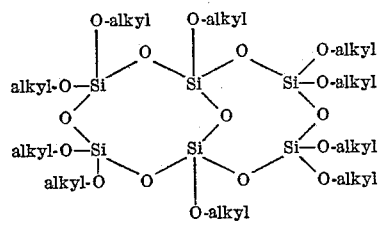

or

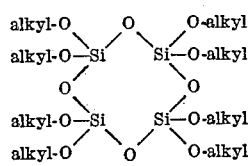

Some straight chains and branched chain

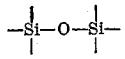

compounds, likewise will doubtless be present. The alkyl groups preferably are normal or straight chain such as methyl, ethyl, propyl, butyl, amyl, and the like. In some instances the alkyl radical may be replaced by unsaturated groups such as allyl groups. Some of the groups may be alkyl or saturated while the others are unsaturated.

Normal and branched chained alkoxypolysiloxane radicals are represented by the following formulae:

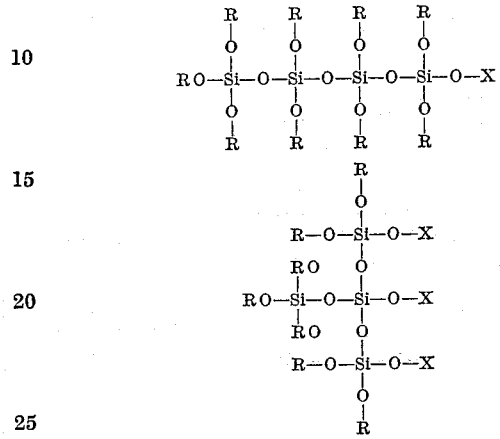

in which groups R are saturated or unsaturated aliphatic hydrocarbon radicals, and X may be the same as R, or may comprise added alkoxysiloxane radicals.

Alkoxypolysiloxanes or polysilicates may conveniently be prepared by reacting silicon tetrachloride with an alcohol such as normal butyl alcohol to form tetrabutoxysilane which is subsequently partially hydrolized and condensed to form alkoxypolysiloxanes suitable for use as modifying agents for alkyd resins as herein disclosed. The preparation of an alkoxypolysiloxane by hydrolysis and condensation from a tetra alkoxysilane such as tetramethoxysilane may be represented by the equation:

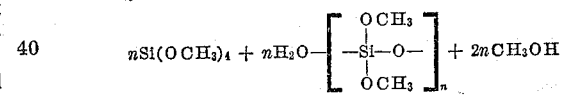

Alkoxypolysiloxanes can also be formed directly from silicon tetrachloride and a normal or straight chain alcohol. A very satisfactory method is disclosed in a copending application filed of even date by Melvin M. Olson and Roger M. Christenson and entitled Preparation of Alkoxypolysiloxanes. The method may be outlined as follows: a mixture of an alcohol, e. g., methyl, ethyl, propyl, butyl, allyl, methallyl or the like (usually about 3 moles) and a carboxylic acid (about one mole) such as acetic acid, is added slowly to silicon tetrachloride. The proportions of reactants is so chosen that the sum of the moles of hydroxyl groups and moles of carboxylic acid groups is equal to, or slightly exceeds the total number of gram atoms of chlorine in the silicon tetrachloride. In the reaction, the temperature is kept at a point sufficiently low to minimize the side reaction between hydrogen chloride and alcohol to form water. The reaction is continued until hydrogen chloride ceases to evolve at the reflux temperature of the reaction mixture. The pressure is then reduced and the volatile products, including evolved alcohol and water, are removed by distillation under reduced pressure, leaving the alkoxypolysiloxane as a residue.

It is believed that the siloxane linkages are formed through preliminary formation of silanol intermediates, e. g., those having

groups, by condensation and loss of water:

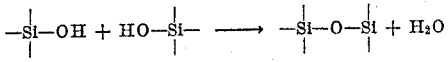

and that this water can again cause further silanol formation and condensation. The overall reaction is represented by the equations:

$$n\text{BuOH} + n\text{HOAc} \rightarrow n\text{H}_2\text{O} + n\text{BuOAC}$$

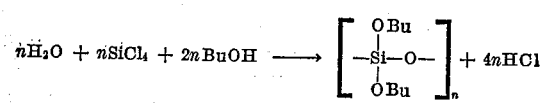

The formulae are for purposes of illustration only. The desired silica compound may be represented by the formula:

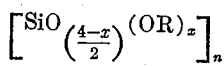

where $x$ is a number, whole or fractional and usually is in a range of about 1 to 3, $n$ is a whole number at least as great as 2 and usually will be less than 100. R is hydrocarbon, e. g., alkyl. It is an advantage of this technique that the precise amount of water required for reaction is liberated automatically as required for hydrolysis of the silicon tetrahalide, thus reducing the tendency of the reaction mixture to undergo undesired side reactions.

The alkoxypolysiloxanes obtained by this method are generally pale yellow to white liquids of relatively low viscosity and of an average silicon content above 4 per molecule. They remain unchanged during storage, a fact which indicates an essentially complete lack of silanol hydroxyl groups in the polysiloxane resins.

The preparation of an alkoxypolysiloxane suitable for subsequent reaction with an alkyd resin to provide a modified alkyd resin in accordance with the provision of the present invention is illustrated by the preparation of butoxy polysiloxane which was carried out as follows: the reaction vessel comprised a 5-liter, 3-necked round bottom flask equipped with a rubber seal stirrer, reflux condenser and a dropping funnel. In this flask was placed 2006.8 grams (11.75 moles) of silicon tetrachloride. The flask was then surrounded by an ice water cooling bath and a mixture of 2610.7 grams (35.3 moles) of n-butanol which had been dried by distillation, and 706 grams (11.75 moles) of glacial acetic acid was added through the dropping funnel over a period of 4 hours. The reaction mixture was rapidly stirred during this addition and during subsequent operations. When the addition was complete the reaction mixture was allowed to stand overnight while inert gas, dried by passage through concentrated sulfuric acid, was passed through the system. The mixture was heated on a steam bath for 3½ hours and refluxed for ½ hour. The volatile material was distilled at 10 mm. (absolute pressure) until a temperature of 155 was attained.

The residue was butoxysiloxane of a $SiO_2$ content of 35.7 percent. The butoxy to silica ratio was 1.66 to 1. This butoxypolysiloxane was suitable for ester interchange with an alkyd resin in accordance with this invention.

The foregoing method also is applicable to the preparation of esters of polysiloxanes and unsaturated alcohols. This reaction is illustrated by the preparation of allyloxy polysiloxane which was conducted as follows: the reaction vessel comprised a 500 milliliter round bottom flask having three necks and being equipped with a dropping funnel, a rubber sealed stirrer and a reflux condenser. Into this flask was placed 170 grams (1 mole) of silicon tetrachloride and the vessel was disposed upon an ice water bath and a mixture of 176.7 grams (3 moles) of allyl alcohol (dried by distillation) and 60 grams (1 mole) of glacial acetic acid was added dropwise over a period of 1 hour and 40 minutes. During the addition the mixture was stirred continuously. The mixture was allowed to stand overnight at room temperature. Subsequently, the mixture was heated in a hot water bath at a temperature of 75° C. for 2 hours and 40 minutes, at the conclusion of which time the material was heated for 2 hours and 25 minutes on a steam bath. Volatile components were stripped at a pressure of 10 millimeters of mercury (absolute) at steam bath temperature. The allyloxy to silicon ratio of the product was calculated as 1.43 to 1. This allyloxypolysiloxane could be employed to modify alkyd resins in accordance with the provisions of the present invention.

In order to modify an alkyd resin with an alkoxypolysiloxane, for example one prepared as above described, an alkyd resin containing a known quantity of free hydroxyl groups is mixed with a polysiloxane containing a known proportion of alkoxy groups in such proportion that the number of hydroxyl groups in the alkyd resin is equal to or slightly exceeds the number of alkoxy groups in the siloxane (as determined indirectly, for example, by analyzing the siloxane for $SiO_2$ content.) A non-reactive solvent such as a hydrocarbon, e. g., toluene, xylene or naphtha, preferably is included in the reaction mixture. The latter is heated to produce an ester interchange reaction in which alkyl alcohol is liberated and is removed by azeotropic distillation of the inert, or non-reactive solvent. The reaction is continued until a desired amount of alkyl alcohol is evolved, or until the reaction mixture becomes relatively viscous, for example, until viscosity is constant, or until it reaches a viscosity of Z at a 50 percent solids content in the hydrocarbon employed.

The preparation of an alkoxypolysiloxane modified alkyd resin in accordance with the provisions of the present invention is illustrated by the following example:

*Example 1*

An alkyd resin containing free hydroxyl groups was prepared as follows: cottonseed fatty acids in an amount of 879 grams (3.54 moles) were mixed with phthalic anhydride in an amount of 714 grams (4.82 moles), glycerine 591.7 grams (6.42 moles) and 300 grams of xylene. The reaction was catalyzed with 1 gram of litharge. The mixture was refluxed with rapid stirring in a vessel equipped with a device for azeotropic distillation of water and return of the xylene to the reaction vessel. During the reaction, the mixture was protected from oxidation by an atmosphere of an inert gas such as a combustion gas. The reaction was continued until there was no further separation of water. The resultant solution of alkyd resin had a hydroxy value of 151 as determined in milligrams of potassium hydroxide and an acid value of 1, also determined in milligrams of potassium hydroxide. The mixture was of a solids content of 91.6 percent by weight.

To the foregoing alkyd resin was added 472 grams of butoxypolysiloxane having a butoxyl to silicon ratio of about 1.5 representing a total of 4.5 moles of butoxyl groups. This butyl polysilicate or butoxy polysiloxane was prepared by the previously described method and was free of carbon-silicon bonds and acetoxy groups. The mixture was compatible and was refluxed with rapid stirring. Distillate was removed at a boiling point of 120 to 128° C. The reaction was continued for one hour, the temperature of the reaction being raised to 152° C. to 153° C. During this time 1223 grams of alpihatic naphtha boiling in a range of 140° C. to 195° C. was added in seven different portions. At the conclusion of the hour the reaction mixture was thinned with 710 grams of naphtha to provide a resin solution of the following characteristics:

| | |
|---|---|
| Gardner-Holdt viscosity | $Z_1$ to $Z_2$ |
| Solids content_____percent by weight__ | 45.7 |
| Acid value | 8.60 |
| Color[1] | 5 to 6 |
| Weight per gallon_____pounds__ | 7.66 |

[1] Color in this and subsequent examples is Gardner-Holdt.

This alkoxypolysiloxane modified alkyd composition was soluble in solvents such as toluol, xylene and others.

It could be pigmented with the various pigments of the coating art and with other modifiers. Solutions of the resin could be spread on surfaces such as iron or steel, wood or the like, and dried or baked to a very hard, mar-resistant, glossy surface.

The distillate weighed 228 grams, had a hydroxyl value in milligrams KOH of 372 and an acid value of 3.4.

*Example II*

In this example an alkyd resin containing free hydroxyl groups was prepared from the following mixture:

| | Grams |
|---|---|
| Soya oil | 914 |
| Glycerine (4.2 moles) | 386 |
| Phthalic anhydride (4.8 moles) | 712 |
| Litharge (catalyst) | 1 |

The soya oil, glycerine and litharge were heated at 210° C. to 220° C. while being stirred vigorously and protected with an inert gas, namely combustion gas, until a 5-milliliter sample of the mixture when dissolved in 20 milliliters of 95 percent ethanol gave a clear solution. The alcoholized soya oil thus obtained was incorporated with the phthalic anhydride and to the mixture was added sufficient xylene to allow rapid removal of water by azeotropic distillation. When approximately the theoretical amount of water had been removed, 242 grams of butoxy polysiloxane having a butoxy to silicon ratio of 1.7 to 1 (a total 2.4 moles of butoxy groups) was added. The mixture was stirred and refluxed while distillate was removed at a boiling point of 123 to 129° C. The reaction was continued for 1¼ hours at a temperature of 155 to 159° C., during which time 800 grams of naphtha boiling in a range of 140 to 195° C. was added in four increments. Subsequently, the mixture was thinned by the addition of 800 grams of naphtha to provide a resin solution having the following characteristics:

| | |
|---|---|
| Gardner-Holdt viscosity | $Z_4$ to $Z_5$ |
| Solids content percent by weight | 54.3 |
| Color | 8 |
| Acid value | 7.2 |
| Weight per gallon pounds | 7.82 |

This solution was compatible with solvents and resins and was made up into coating formulations which when spread and dried by baking or otherwise, were very hard, durable and glossy.

*Example III*

In this example an alkyd resin containing free hydroxyl groups was prepared as follows: 994.3 grams of linseed oil was mixed with 524 grams (5.66 moles) of glycerine and 1 gram of litharge (alcoholysis catalyst) and the mixture was heated at 210° C. to 220° C. while being rapidly stirred and protected from oxidation by an intergas such as a combustion gas. Heating was continued until a 5-milliliter sample of the mixture when dissolved in 20 milliliters of 95 percent ethanol gave a clear solution. To the alcoholized linseed oil was added 774 grams (5.22 moles) of phthalic anhydride, together with sufficient xylene to permit rapid removal of water by azeotropic distillation.

When approximately the theoretical amount of water had been removed, 547 grams of butoxypolysiloxane having a butoxyl to silicon ratio of 1.7 to 1 and being prepared by the method previously described and containing a total of 5.47 moles of butoxy groups was added to the polyester or alkyd. The mixture was refluxed with distillate being removed at a boiling point of 118° C. to 124° C. The reaction was conducted at 150° C. to 154° C. for a period of one hour and 25 minutes during which time 1000 grams of naphtha was added in five increments. At the end of this period the mixture was thinned with 1300 grams of naphtha, giving a resin solution having the following characteristics:

| | |
|---|---|
| Gardner-Holdt viscosity | $Z_1$ to $Z_2$ |
| Solids content percent by weight | 49.2 |
| Color | 10 to 11 |
| Acid value | 10.7 |
| Weight per gallon pounds | 7.73 |

The distillate weighed 186 grams, had a hydroxyl value of 444 and a saponification value of 1.8. The product, like those already described, was a modified alkyd resin which, when spread and dried as a film, had high hardness, mar-resistance, gloss and other valuable properties.

*Example IV*

The alkyd component of this example comprised:

| | Grams |
|---|---|
| Coconut fatty acids (5.9 moles) | 1247 |
| Pentaerythritol (5.07 moles) | 693.7 |
| Phthalic anhydride (4.07 moles) | 602 |
| Litharge | 1 |
| Xylene | 300 |

The reaction was conducted under reflux with rapid stirring and with azeotropic distillation of water and return of the xylene to the reaction vessel. The reaction was continued until there was no further separation of water, at which point 499 grams of xylene and 626 grams of butoxypolysiloxane having a butoxy to silicon ratio of 1.65 and containing a total of 6.3 moles of butoxy groups, were added. This mixture was stirred and refluxed with removal of the distillate at a boiling point of 114° C. to 118° C. The reaction was continued for 1 hour and 25 minutes at a temperature of 146° C. to 158° C. during which time, 827 grams of xylene was added in three increments. The mixture was thinned with 635 grams of xylene to provide a resin solution having the following characteristics:

| | |
|---|---|
| Gardner-Holdt viscosity | T–U |
| Solids content percent by weight | 59.4 |
| Color | 2 to 3 |
| Acid value | 2.7 |
| Weight per gallon pounds | 8.24 |

The resin product was a good coating medium adapted to dry to hard, glossy films when baked.

*Example V*

In accordance with this example, 1338.5 grams of soya oil was mixed with 495.3 grams (3.62 moles) of pentaerythritol and 1 gram of litharge. This mixture was heated at 200° C. to 240° C. for 5 hours while the reaction mixture was protected from oxidation by an inert atmosphere as, for example, a mixture of combustion gases. To the resultant alcoholized soya oil was added 603 grams (4.08 moles) of phthalic anhydride and 300 grams of xylene. This mixture was stirred and refluxed while water was removed by azeotropic distillation. The product was an alkyd resin containing free hydroxyls.

When approximately the theoretical amount of water had been removed, 638.5 grams of butoxypolysiloxane having a butoxy content of 6.3 moles, was added along with 500 grams of xylene. This mixture was stirred and refluxed while distillate was removed at a boiling point of 119° C. to 125° C. Temperature of reaction was 136° C. to 155° C. and was continued for 3 hours, during which time, 1200 grams of xylene was added in six increments. At the end of this time, the reaction mixture was thinned with 400 grams of xylene to provide a resin solution having the following characteristics:

| | |
|---|---|
| Gardner-Holdt viscosity | T to U |
| Solids content percent by weight | 59 |
| Color | 5 to 6 |
| Acid value | 10.5 |
| Weight per gallon pounds | 7.95 |

This composition could be spread and dried to provide hard, mar-resistant and durable films.

Example VI

In this example the alkyd body containing free hydroxyl groups prepared as disclosed in Example I may be employed. For the butoxypolysiloxane as disclosed in Example I, substitute an equivalent amount of ethoxypolysiloxane and proceed as in Example I. As a result of the reaction between the ethoxypolysiloxane and the alkyd body, there is formed a modified product containing a high percentage of silica and which, when spread as a film dried by baking or otherwise, forms a hard, durable surface coating.

Example VII

In accordance with the provisions of this example the butoxypolysiloxane of Example I is replaced by an equivalent amount of allyloxypolysiloxane prepared as previously described. The mixture of cottonseed acid modified alkyd resin and allyloxypolysiloxane as thus obtained, is reacted by ester interchange to evolve free allyl alcohol which can be recovered. However, it will be understood that a certain percentage of the allyloxy radicals can be retained by the siloxane component of the modified alkyd. The terminal $>C=CH_2$ groups incorporated into the alkyd may be caused to undergo various addendum reactions to which the allylic compounds are usually adaptable. For example, they may be caused to undergo homopolymerization by heating the alkyd in the presence of a peroxide catalyst such as benzoyl peroxide. They may also be interpolymerized by addition with cyclopentadiene or with polyesters of glycol such as ethylene glycol or diethylene glycol and alpha-beta ethylenically unsaturated acids such as maleic acid or the like.

The invention includes reacting an allyloxypolysiloxane with a polymerizable polyester of an alpha-beta ethylenic dicarboxylic acid such as maleic acid and a glycol such as propylene glycol, where the glycol component is employed in excess. These polyesters may include a saturated dicarboxylic acid such as phthalic or succinic acid in a ratio of 1 to 10 moles per mole of maleic acid. Glyceride oil acids may also be present. The reaction between such polyester and allyloxy polysiloxane can be explained as involving ester interchange between free hydroxyls of alkyd resin and the allyloxy groups of the polysiloxane. Any allyl groups which remain attached to the silicon atoms can react with ethylenic groups of the polycarboxylic ester to produce cross-linking between polyester molecules. Benzoyl peroxide, tertiary butyl peroxide or the like may be employed to promote such cross-linking.

Example VIII

In accordance with the provisions of this example, a polyester of a dihydric alcohol such as diethylene glycol and a mixture of maleic acid and phthalic acid is caused to undergo ester interchange with butoxypolysiloxane. The resultant modified polyester may further be admixed with a monomer containing a $>C=CH_2$ group, for example, with styrene or with vinyl acetate or the like and polymerized in the presence of benzoyl peroxide or other free radical catalyst by the application of heat.

Example IX

A butoxypolysiloxane modified alkyd resin of the composition was prepared:

| | Parts by weight |
|---|---|
| Cocoanut oil acid triglycerides | 43 |
| Glyceryl phthalate | 43 |
| Glyceryl polysilicate | 14 |

The silicon content of the butoxypolysiloxane used in this preparation calculated as $SiO_2$ was 36 percent by weight; the butoxy to silicon ratio was 1.64:1, the total moles of butoxy based on silicon was 4.6. In the alkyd body, the free hydroxyls were present to an extent of 6½ moles, 2.78 moles of butyl alcohol distilled off in the ester-interchange reaction. The butoxypolysiloxane modified alkyd was diluted with aliphatic naphtha boiling in a range of 140 to 195° C. to provide a solution of 50% by weight solids content. At this dilution, the material had a viscosity of $Z_5$-$Z_6$ (Gardner-Holdt) an acid value of 12.8 and a color of 3–4 and a weight per gallon of 7.72 pounds.

This solution, at appropriate dilution with naphtha, may be spread as a film by brushing, spraying, or similar methods, upon wood or metal and dried to provide hard, mar-resistant films.

A butoxypolysiloxane modified alkyd body was prepared, employing the techniques described in the preceding examples. The modified body comprised soya oil 64.5 percent by weight, glyceryl phthalate 21.5 percent by weight, butoxypolysiloxane 14 percent by weight. The silicon content of the butoxypolysiloxane used calculated as $SiO_2$ was 36 percent, the butoxy to silicon ratio was 1.64, the total moles of butoxy groups in the starting butoxypolysiloxane was 4.60. The alkyd contained 6.5 moles hydroxyl. The approximate butanol content derived from the ester interchange reaction was 2.86 moles constituting approximately 62.2 percent of the total butoxy content of the butoxypolysiloxane.

The material when made up to a solids content of 84.7 percent by weight in naphtha boiling in a range of 140–195° C., was of a viscosity of Y to Z, an acid value of 17.3, a color of 13–14 and weighed 8.3 pounds per gallon.

Example X

This example was similar to Example IX, except that glyceryl phthalate was replaced by an equal weight of pentaerythritol phthalate. The butoxy to silicon ratio in the butoxypolysiloxane component of the modified body was 1.60, the total moles of butoxy groups in the butoxypolysiloxane was 4.51. The alkyd body contained 6.3 moles of free hydroxyl groups. 3.50 moles of the butoxyl groups of the butoxypolysiloxane appeared in the distillate from the ester interchange and represented 77.6 percent of the total butoxyls. This modified body then made up to 66.7 percent solids in naphtha as previously described, was of a viscosity of N, an acid value of 5.1, a color of 7–8, and weighed 7.9 pounds per gallon.

Example XI

This example illustrates the preparation of a pigmented composition of an ester interchange product of an alkyd resin and an alkoxypolysiloxane. The alkyd resin component was prepared from the following components:

| | Grams |
|---|---|
| Linseed oil | 498.2 |
| Glycerine (2.78 moles) | 258.7 |
| Phthalic anhydride (2.6 moles) | 387.6 |
| Litharge | 0.4 |

The foregoing components were reacted in accordance with the following schedule:

The linseed oil was mixed with glycerne and heated to 190° C., whereupon the litharge was added. This mixture was then heated at 210 to 220° C. for three hours; the phthalic anhydride and 150 milliliters of xylene were then added and the mixture was stirred and refluxed with azeotropic separation of water. The reaction was continued until water ceased to evolve; the product was then cooled and the resin obtained had the following characteristics:

| | |
|---|---|
| Hydroxyl value | 135.6 |
| Acid value | 1.54 |
| Solids content in percent by weight | 88.2 |

A butoxypolysiloxane was then made up as follows:
A mixture of 331.8 grams (4.5 moles) of n-butanol was mixed with 90 grams (1.5 moles) of glacial acetic acid, the resultant mixture was added slowly to 255 grams (1.5 moles) of silicon tetrachloride and the resultant mixture was refluxed for two hours and then cooled. The product, together with 188.7 grams of xylene, was added to 1197.6 grams of the alkyd resin having 2.93 molar equivalents of free hydroxyl groups. The mixture of resins was then stirred and heated with removal of distillate until a temperature of 147° C. was reached. The product was thinned with naphtha (B. P. 140–195° C.) to provide a solution of 67.4 percent by weight solids content. The resin was of the following characteristics:

| | |
|---|---|
| Acid value | 10.5 |
| Weight per gallon pounds | 8.42 |
| Solids content in percent by weight | 67.4 |
| Viscosity | Z to $Z_2$ |
| Gardner color | 13–14 |

The product was of the following theoretical composition:

| | Percent |
|---|---|
| Linseed oil | 43 |
| Glyceryl phthalate | 43 |
| Glyceryl polysilicate | 14 |

The resultant alkoxypolysiloxane-alkyd resin product was then formulated into a pigmented coating composition as follows:

| | Percent |
|---|---|
| Butoxypolysiloxane-linseed oil modified phthalic glyceride alkyd | 43.5 |
| Melamine-formaldehyde resin | 18.0 |
| Ferric oxide hydrate | 4.1 |
| Ferric oxide | 0.7 |
| Titanium dioxide (rutile type) | 33.6 |

The pigments were first milled into the butoxypolysiloxane-alkyd resin component and the rest of the materials were added.

The composition was diluted with a solvent mixture comprising 60 percent by weight of high flash naphtha and 40 percent by weight of xylene to a solids content of 60.5 percent. The pigmented composition was diluted to spray consistency with high flash naphtha and was then sprayed on to test panels which were baked for 30 minutes, at 275° F. The spray panels in this instance, were Bonderized steel. The product had excellent mar resistance, hardness, and had an impact resistance of 724 inch-pounds. The flexibility was >18 percent on a conical mandrel.

*Example XII*

This example constitutes a further illustration of the preparation of a pigmented composition from an alkoxy polysiloxane-alkyd resin. The composition was as follows:

| | Percent by weight |
|---|---|
| Alkoxypolysiloxane-alkyd [1] | 9.0 |
| Linseed oil modified alkyd | 35.6 |
| Titanium dioxide (rutile type) | 32.0 |
| Aluminum stearate | 0.32 |
| China clay | 11.35 |

[1] From Example III.

This mixture was made up to a solids content of 61.0 percent in a hydrocarbon mixture comprising:

| | Percent by weight |
|---|---|
| High flash naphtha | 77.2 |
| Heavy naphtha (49°) | 22.8 |

The pigments were first dispersed in a mixture of equal parts by weight of the alkyd and the polysilicate and the remaining material was then added.

For test purposes, panels were coated with the material by spraying with a solution made up in naphtha to a consistency of 29 seconds in Ford cup No. 4 and were then cured for 60 minutes at 275° F. The resultant films were of flat finish, were quite hard and mar resistant and by conical mandrel test, had a flexibility of <18 percent. The impact resistance was 712 inch-pounds.

It will be apparent to those skilled in the art that the forms of the invention herein disclosed are by way of example or illustration. It will be apparent that numerous modifications may be made therein without departure from the spirit of the invention or the scope of the appended claims.

I claim:

1. A method of forming a resinous coating material soluble in xylene, toluene and in naphtha, said method comprising the steps of subjecting to ester interchange a mixture of alkyd containing free hydroxyl groups and a polysiloxane compound of the formula:

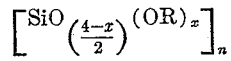

where R is alkyl, $x$ is a number from about 1 to 3 and $n$ is an integer greater than one, by refluxing the said mixture in an inert diluent.

2. A method of forming a modified alkyd resin which comprises the steps of heating under reflux and with evolution of an alkyl alcohol, a polyester of a polyhydric alcohol and a polycarboxylic acid containing free hydroxyls and an alkoxypolysiloxane in which each silicon atom has four oxygen atoms directly joined thereto and in which there are at least 1.4 alkoxy groups per silicon atom.

References Cited in the file of this patent

UNITED STATES PATENTS

| | | |
|---|---|---|
| 2,395,550 | Iler et al. | Feb. 26, 1946 |
| 2,587,295 | Doyle et al. | Feb. 26, 1952 |
| 2,589,243 | Goodwin et al. | Mar. 18, 1952 |
| 2,686,740 | Goodwin | Aug. 17, 1954 |